United States Patent [19]
Van Paesschen et al.

[11] 3,856,530
[45] Dec. 24, 1974

[54] PHOTOGRAPHIC POLYESTER FILM MATERIAL COMPRISING ANTISTATIC LAYER

[75] Inventors: August Jean Van Paesschen, Antwerpen; Joseph Antoine Herbots, Edegem; Daniel Maurice Timmerman, Mortsel, all of Belgium

[73] Assignee: Agfa-Gevaert, Mortsel, Belgium

[22] Filed: July 30, 1973

[21] Appl. No.: 383,549

Related U.S. Application Data

[62] Division of Ser. No. 84,926, Oct. 28, 1970, Pat. No. 3,786,002.

[30] Foreign Application Priority Data

Oct. 29, 1969 Great Britain.................... 53026/69

[52] U.S. Cl. ................................. 96/87 A, 96/87 R
[51] Int. Cl............................................. G03c 1/82
[58] Field of Search ...... 96/87 A; 252/500; 117/201

[56] References Cited
UNITED STATES PATENTS 2,627,088   2/1953   Alles et al........................... 96/87 A
3,514,291   5/1970   Vanpoecke et al................. 96/87 A Primary Examiner—Ronald H. Smith
Attorney, Agent, or Firm—William J. Daniel

[57] ABSTRACT

A photographic film material comprising a polyester film support and at least one silver halide emulsion layer is provided with an antistatic coating comprising a homogeneous mixture of (A) a chlorine-containing polymer consisting of at least 70% by weight of at least one monomer taken from vinyl chloride and vinylidene chloride, and (B) a polymeric material having electroconductive properties, the ratio of chlorine-containing polymer to electroconductive polymeric material varying between 2:1 and 1:2 parts by weight.

8 Claims, No Drawings

PHOTOGRAPHIC POLYESTER FILM MATERIAL COMPRISING ANTISTATIC LAYER

This is a division of Ser. No. 84,926, filed Oct. 28, 1970, now U.S. Pat. No. 3,786,002.

This invention relates to antistatic coating compositions and to photographic films and materials comprising them.

It is known that in photographic materials the usual synthetic film supports have the property of being charged electrostatically, so that the charged films strongly attract the surrounding dust and thereby become soiled at their surface. Moreover, when such film supports are provided with a silver halide emulsion layer, discharge images may become visible in the light-sensitive layer upon development. Such an electrostatic charging results from the friction of the film support or light-sensitive photographic material during winding or unwinding in the coating, cutting or packing machines and by running the photographic material through the camera and the projector.

Although it is known that in practice the appearance of electrostatic charges on synthetic resin supports can be avoided by the application thereto of an electroconductive layer, it is also known that in the case of a polyester film support it is very difficult to establish and maintain a satisfactory bond between the surface of the poylester film support and the antistatic layer applied thereto. In most cases more than one layer is needed, for example first a special adhesive layer followed by the proper antistatic layer, whereto sometimes a protective layer is applied.

According to the invention a monolayer antistatic coating composition is provided on a polyester film support, comprising an homogeneous mixture of (A) a chlorine-containing polymer consisting of at least 70% by weight of at least one monomer taken from vinyl chloride and vinylidene chloride, and (B) a polymeric material having electroconductive properties, the ratio of chlorine-containing polymer to electroconductive polymeric material in said homogeneous mixture varying between 2:1 and 1:2 parts by weight.

The antistatic layer according to the invention makes that the polyester film in photographic and other applications attracts no dust and causes no spark discharges any longer. This layer adheres to the polyester film very firmly, is very clear and is little susceptible to being scratched. If desired, the friction coefficient of the layer can still be lowered by the addition of a small amount of a suitable wax.

The coating mixture of the antistatic layer comprises a chlorine-containing polymer wherein at least 70% by weight of at least one of the monomers taken from vinyl chloride and vinylidene chloride is present. Suitable polymers are e.g.:

after-chlorinated polyvinyl chloride,
the copolymer of vinyl chloride and vinyl acetate (85:15),
the copolymer of vinyl chloride and vinyl isobutyl ether (75:25),
the copolymer of vinylidene chloride and acrylonitrile (75:25),
the copolymer of vinylidene chloride, N-tert.-butylacrylamide, n-butyl acrylate, and N-vinylpyrrolidone (70:23:3:4), the
the of vinylidene chloride, N-tert.-butylacrylamide, n-butyl acrylate, and itaconic acid (70:21:5:4), the
copolymer of vinylidene chloride, N-tert.-butylacrylamide, and itaconic acid (88:10:2),
the copolymer of vinylidene chloride, n-butylmaleamide, and itaconic acid (90:8:2),
the copolymer of vinyl chloride, vinylidene chloride and methacrylic acid (65:30:5),
the copolymer of vinylidene chloride, vinyl chloride, and itaconic acid (70:26:4)
the copolymer of vinyl chloride, n-butyl acrylate, and itaconic acid (72:24:4)
the copolymer of vinylidene chloride, n-butyl acrylate and itaconic acid (80:18:2),
the copolymer of vinylidene chloride, methyl acrylate, and itaconic acid (90:8:2),
the copolymer of vinyl chloride, vinylidene chloride, N-tert.-butylacrylamide, and itaconic acid (50:30:18:2),
the copolymer of vinylidene chloride, methyl acrylate and itaconic acid (83:15:2), and
the copolymer of vinylidene chloride, acrylonitrile and acrylic acid (78:12:10).

All the ratios given between brackets in the above mentioned copolymers are ratios by weight.

The above copolymers are only examples of the combinations that can be made with different monomers, and the invention is not limited at all to the copolymers enumerated.

The different monomers indicated above may be copolymerised according to various methods. For example the copolymerisation may be conducted in an aqueous dispersion containing a catalyst and an activator. Alternatively, polymerisation of the monomeric components may occur in bulk without added diluent, or the monomers, may be allowed to react in appropriate organic solvent reaction media.

The coating mixture comprises also an electroconductive polymeric material to be chosen from a very large number of known polymers or copolymers such as:

polyethylene oxide
alkali metal salts of:
— partially or completely sulphonated polystyrene (also in free acid form)
— copolymers of acrylic, methacrylic or maleic acid
— polyvinylsulphonic acid (also in free acid form)
— polyvinylphosphonic acid
polyethylenimine hydrochloride
quaternized polyethylenimine
polymers and copolymers of:
— N-vinyl-4-methyl-2-oxazolidinone
— N-vinyltrimethylammonium chloride
— N-(3-acrylamido-propyl)-trimethylammonium chloride
— acryloyloxylethyldimethylsulphonium chloride
— N-(methacryloyloxyethyl)-trimethylammonium chloride
— N-(methacryloyloxyethyl)-trimethylammonium methyl sulphate
— N-(2-hydroxy-3-methacryloyloxypropyl)-trimethylammonium chloride
— N-(acryloyloxyethyl)-pyridinium chloride
— N-methyl-4-vinylpyridinium chloride
— vinylbenzyltrimethylammonium chloride
— glycidyltributylphosphonium chloride
polymers obtained when polyepichlorohydrin is used as quaternizing agent for a tertiary amine, a tertiary phosphine or a secondary sulphide, polymers obtained by the reaction of polyepichlorohydrin with a secondary amine, e.g. morpholine or with a mercaptan such as 2-mercapto-ethanol, followed by the quaternization with an alkylating agent such as an ester of an alcohol and a strong acid such as the methyl or ethyl ester of sulphuric acid, phosphoric acid, hydrochloric acid, hydrobromic acid or hydroiodic acid, e.g. dimethyl sulphate or bromoethanol.

In order to form the antistatic layer on the polyester film support the chlorine-containing polymer and the electro-conductive polymeric material are dissolved in a common solvent or in miscible solvents. The ratio between both polymers naturally depends on the respective polymers used. In general a ratio taken between 1:2 and 2:1 of chlorine-containing polymer to electroconductive polymeric material will give good results as antistatic layer.

In order that the layer should have a sufficient conductivity and that it can be used as an antistatic coating on a polyester film, the surface resistance should not exceed well defined limits, which themselves are influenced by the degree of relative humidity. For example, the surface resistance at 30% relative humidity should be lower than $1.10^{10}$ ohm/10 sq.cm, whereas at 60% relative humidity it should be lower than $1.10^9$ ohm/10sq.cm.

The antistatic coating composition is applied in such concentration and manner known in the art as to yield on the polyester film support an antistatic layer having a thickness of preferably between 0.4 and 1.0 micron.

The electroconductivity of the antistatic layer formed from the mixture of chlorine-containing polymer and electroconductive polymeric material is determined by measuring its surface resistance. Therefore, after conditioning at a specific relative humidity a material composed of a polyester film support whereupon an antistatic coating according to the invention is applied, the surface resistance of the material is measured by means of a cell, both poles of which have a width of 0.5 cm and are at a distance of 1 cm from each other.

In the examples various layers and their conductivity are described.

In addition to the chlorine-containing polymer and the electroconductive polymeric material the composition of the antistatic layer may include small amounts, e.g. between 10 and 20% by weight with respect to the dry weight of the whole coating composition, of a waxy material, such as unbranched saturated fatty acids, e.g. stearic acid and palmitic acid, esters derived from fatty acids and fatty alcohols, e.g. stearyl stearate and n-hexadecyl palmitate, pentaerythritol esters of fatty acids such as stearic acid, palmitic acid and lauric acid, sucrose diesters of fatty acids such as sucrose distearate, N,N-alkylene-bis-fatty acid amides, e.g. N,N-ethylene-bis-oleylamide and montan wax derivatives, which are generally glycerol, glycol or polymerised ethylene glycol esters of acids from montan wax. These waxy materials are added to the coating composition of the antistatic layer to improve its resistance to friction and scratching.

The layer according to this invention may be applied by spray, brush, roller, doctor blade, air brush or wiping techniques. Due to the presence of the chlorine-containing polymer the adherence of this layer to the polyester support is excellent in dry as well as in wet state.

According to the invention also a photographic film material is provided comprising a polyester support, at least one light-sensitive silver halide emulsion layer on one side of the polyester support, and an antistatic layer comprising the mixture of chlorine-containing polymer and of electroconductive polymeric material on the other side of that support.

Films having an antistatic layer according to the present invention may serve for the manufacture of photographic black-and-white as well as colour films.

The monolayer antistatic coating can also be applied to both sides of a polyester film support. In this way a material is obtained that does not attract the surrounding dust, that has excellent optical properties and can be used as a mounting foil, a drafting foil or as a support for copying processes.

The examples given hereinafter especially refer to the use of polyethylene terephthalate film as support. The invention is not restricted, however, to the use of film derived from the polycondensation of terephthalic acid and ethylene glycol. In the preparation of the high molecular weight polyester other glycols may partially or wholly replace ethylene glycol, e.g. neopentyl glycol and 1,4-di(hydroxymethyl)-cyclohexane. Terephthalic acid too may be replaced partially or wholly by other dibasic acids such as, e.g., isophthalic acid, sebacic acid and adipic acid.

The following examples illustrate the present invention.

EXAMPLES 1 to 6

6 portions were made of solutions of 0.6 g of the sodium salt of copoly(styrene maleic acid) in 20 ml of methanol and each portion was mixed with 80 ml of butanone in which 0.3 g of a chlorine-containing polymer was dissolved. The different chlorine-containing polymers were the following in the respective examples:

1. copolymer of vinyl chloride and vinyl isobutyl ether (75:25% by weight),
2. copolymer of vinylidene chloride and acrylonitrile (75:25% by weight),
3. copolymer of vinyl chloride and vinyl acetate (87:13% by weight),
4. after-chlorinated polyvinyl chloride,
5. copolymer of vinyl chloride and vinyl acetate (90:10% by weight
6. copolymer of vinylidene chloride, N-tert.-butylacrylamide, n-butyl acrylate and itaconic acid (70:23:3:4% by weight).

The solution obtained was coated at a rate of 10 ml/sq.m on a biaxially oriented polyethylene terephthalate film of 100 $\mu$ thickness.

The layers applied were dried by evaporation of the solvents, and samples of the coated films were conditioned at relative humidities of 30 and 60%, whereafter their surface resistance was measured. Comparative tests were also made wherein the coating applied to the polyester did not contain the electroconductive polymer. The following results were noted.

| Ex. No. | Surface resistance in $10^{10}$ ohm/10 sq.cm | |
|---|---|---|
| | at 30% relative humidity | at 60% relative humidity |
| 1 | 0.30 | 0.010 |
| 2 | 0.40 | 0.009 |
| 3 | 0.30 | 0.015 |

-Continued

| Ex. No. | Surface resistance in $10^{10}$ ohm/10 sq.cm | |
|---|---|---|
| | at 30% relative humidity | at 60% relative humidity |
| 4 | 0.35 | 0.010 |
| 5 | 0.30 | 0.010 |
| 6 | 0.10 | 0.003 |

For the samples without electroconductive polymer surface resistances above $500:10^{10}$ ohm/sq.cm were found.

In order to improve the resistance of the antistatic layer to friction and scratching a small amouint of a waxy material such as N,N-ethylene-bis-stearamide, for instance between 10 and 20% by weight with respect to the dry weight of the antistatic layer, was added to the coating composition. This small amount did not harm the surface resistance.

As waxy material were especially advantageous stearic acid and its sodium salt, pentaerythritol stearate, sucrose distearate, N,N-ethylene-bis-stearamide and ethylene glycol esters of acids from montan wax.

EXAMPLES 7 to 9

In these Examples the surface resistance of polyester film materials coated with an antistatic layer was measured with varying ratio of electroconductive polymer in the antistatic layer.

Three portions of 0.6 g of copolymer of vinylidene chloride, N-tert.-butylacrylamide, n-butyl acrylate and N-vinylpyrrdidone (70:23:3:4% by weight) were dissolved each in 80 ml of butanone.

To each solution a quantity of the sodium salt of the copolymer of styrene and maleic acid was added dissolved in 20 ml of methanol. These quantities were as follows:

in Example 7:0.3 g
in Example 8:0.45 g
in Example 9:0.6 g.

The solutions were coated on a biaxially oriented polyethylene terephthalate film of 180 μ. After evaporation of the solvents, the surface resistance of the different samples was measured at 30 and 60% of relative humidity. The following results were noted.

| Ex. | Surface resistance in $10^{10}$ ohm/10 sq.cm | |
|---|---|---|
| | at 30% relative humidity | at 60% relative humidity |
| 7 | 0.30 | 0.010 |
| 8 | 0.20 | 0.006 |
| 9 | 0.01 | 0.005 |

EXAMPLES 10 to 13

In these Examples the surface resistance of polyester film materials coated with an antistatic layer was measured wherein the antistatic layer contained different electroconductive polymers.

Four portions of 0.3 g of copolymer of vinylidene chloride, N-tert.-butylacrylamide, n-butyl acrylate and N-vinylpyrrolidone (70:23:3:4% by weight) were dissolved each in a mixture of 50 ml of butanone and 10 ml of ethylenechlorohydrin. Each time an amount of 0.6 g of electroconductive polymer was dissolved in 40 ml of butanone and added to the chlorine-containing polymer solutions. The electroconductive polymers used were the following:

— in Example 10:
  copolymer of N-(methacryloyloxyethyl)-trimethylammonium methylsulphate, β-chloroethyl methacrylate, and the sodium salt of acrylic acid (60:25:15 mole %), a 10% by weight aqueous solution of which has a pH of 7.

— in Example 11:
  copolymer of vinylbenzyltrimethylammonium chloride, sodium salt of acrylic acid and vinylbenzyl chloride (52:4:44 mole %).

— in Example 12:
  copolymer of styrene, β-chloroethyl acrylate and the monosodium salt of maleic acid (49:5:46 mole %)

— In Example 13:
  copolymer of N-(acryloyl-oxyethyl)pyridinium chloride and β-chloroethyl acrylate (62:38 mole %)

The solutions were coated on a biaxially oriented polyethylene terephthalate film of 100μ. The solvents were evaporated and the surface resistance of the different samples were measured at 30 and 60% of relative humidity. The following results were obtained:

| Ex. No. | Surface resistance in $10^{10}$ ohm/10 sq.cm. | |
|---|---|---|
| | at 30% relative humidity | at 60% relative humidity |
| 10 | 0.5 | 0.005 |
| 11 | 0.5 | 0.005 |
| 12 | 0.6 | 0.030 |
| 13 | 0.4 | 0.010 |

EXAMPLE 14

0.5 g of the copolymer of styrene and styrene sulphonic acid (77:23 mole %) was dissolved in a mixture of 20 ml of methanol and 5 ml of ethylenechlorohydrin. To this solution is added a solution of 0.3 g of the copolymer of vinyl chloride and vinyl acetate (87:13 %) by weight) in 75 ml of butanone.

The solution was applied to a biaxially oriented polyethylene terephthalate film of 180 μ and dried.

The surface resistance values of the coated polyester film were found to be $0.01 \times 10^{10}$ ohm/10 sq.cm and $0.0001 \times 10^{10}$ ohm/10 sq.cm at 30% and 60% relative humidity respectively.

EXAMPLE 15

0.5 g of the copolymer of N-(methacryloyloxyethyl)-trimethylammonium methylsulphate, β-chloroethyl acrylate and acrylic acid (60:25:15 mole %) was dissolved in 20 ml of methanol, and this solution was mixed with 0.3 g of the copolymer of vinyl chloride and vinyl acetate (87:13% by weight) dissolved in 80 ml of butanone.

The solution was applied to a biaxially oriented polyethylene terephthalate film of 100 μ and dried.

The surface resistance of the coated polyester film was found to be $0.3 \times 10^{10}$ ohm/10 sq.cm and $0.005 \times 10^{10}$ ohm/10 sq.cm at 30% and 60% of relative humidity respectively.

EXAMPLE 16

The front side of a biaxially oriented polyethylene terephthalate film having a thickness of 63 μ was coated with the following composition at 25°–30°C at a rate of 1.5 to 1.75 g/sq.m:

| | |
|---|---|
| copolymer of vinylidene chloride, N-tert.-butylacrylamide, n-butyl acrylate and N-vinylpyrrolidone (70:23:3:4 % by weight) | 5.5 g |
| methylene chloride | 65 ml |
| 1,2-dichloroethane | 35 ml |

The copolymer was manufactured according to the process described in Example 1 of Belgian Patent Specification No. 721,469 filed Sept. 27, 1968 by Gevaert-Agfa N.V.

After drying of the layer, a second layer was applied thereto in a proportion of 25 ml/sq.m from the following compositions:

| | |
|---|---|
| 20 % latex of copolymer of butadiene and methyl methacrylate (50:50 % by weight) | 60 ml |
| 10 % aqueous solution of gelatin | 80 ml |
| water | 457.5 ml |
| silica | 5 g |
| methanol | 400 ml |
| 10 % aqueous solution of a surface active coating aid | 2.5 ml |

The latex was manufactured according to the process described in Example 1 of Belgian Patent Specification No. 721,469 mentioned above.

After drying, a light-sensitive gelatin silver halide emulsion layer was applied to the latter layer, said emulsion being manufactured as follows:

A solution of 100 g of silver nitrate in 1 litre of water was added at 47°C in a period of time of 30 sec to a solution of 70 g of potassium bromide, 1 g of potassium iodide and 25 g of gelatin in 500 ml of water.

10 min. later 70 g of gelatin were added, and after 30 min. the emulsion was solidified. Thereupon the emulsion was shredded, rinsed for 5 min., admixed with 40 g of ripening gelatin, and maintained at 50°C for 4 min. The fine-grained emulsion thus obtained was coated so that each sq.m carried an amount of silver halide equivalent to 4 g of silver.

The rear side of the polyethylene terephthalate film support was provided with an antistatic layer at 10 ml/sq.m from a coating composition consisting of:

| | |
|---|---|
| copolymer of vinyl chloride and vinyl acetate (87:13 % by weight) | 30 g |
| copolymer of styrene and maleic acid sodium salt (50:50) | 50 g |
| N,N-ethylene-bis-oleylamide | 12 g |
| butanone | 750 ml |
| methanol | 200 ml |
| ethylene chlorohydrin | 50 ml |

The antistatic properties of this photographic material were very good. The surface resistance measured on the rear side amounted to $0.5 \times 10^{10}$ ohm/10 sq.cm at 30% relative humidity. Dust was not attracted by this film. After storage in roll form it appeared that the photographic properties of the emulsion, which had been in contact with this rear side, had not been impaired.

EXAMPLE 17

To the front side of a biaxially oriented polyethylene terephthalate film having a thickness of 180 μ a layer was applied at a rate of 1.4 g/sq.m from the following composition:

| | |
|---|---|
| copolymer of vinylidene chloride N-tert.-butylacrylamide, n-butyl acrylate and N-vinylpyrrolidone (70:23:3:4 % by weight) | 5 g |
| methylene chloride | 60 ml |
| 1,2-dichloroethane | 35 ml |
| methanol | 5 ml |

After drying this layer, the surface thereof was exposed to 4 successive corona discharges from a high frequency power supply. This power supply produced a pulsating voltage, the waveform comprising a narrow pulse of a magnitude of 500 kV, followed by a flat portion of 5 kV. The repeat frequency amounted to about 35 kc. The current intensity for each electrode was $1.5 \times 10^{-5}$ A/cm and the film speed was 10 m/min.

After the corona discharge treatment a light-sensitive gelatin silver halide emulsion layer as described in Example 16 was applied.

The rear side of the polyethylene terephthalate film support was provided with an antistatic layer as described in Example 16, except that as antistatic polymer a copolymer of styrene, sodium maleate and β-chloroethyl acrylate (45/45/10) was used. On drying of the layer this antistatic copolymer became insoluble as described in our copending United Kingdom Patent Application No. 4946/69 filed Jan. 29, 1969 by Gevaert-Agfa N.V. (Title: "Electroconductive layers").

The antistatic properties of the photographic material before as well as after treatment in the photographic baths was excellent.

We claim:

1. Photographic film material comprising a polyester film support, at least one light-sensitive silver halide emulsion layer on one side of the polyester support, and on the other side a layer of an antistatic coating composition for a polyester film support, comprising an homogeneous mixture of (A) a chlorine-containing polymer consisting of at least 70% by weight of at least one monomer taken from vinyl chloride and vinylidene chloride, (B) a polymeric material having electroconductive properties, and (C) about 10 to 20% by weight of a waxy material, the ratio of chlorine-containing polymer to electroconductive polymeric material in said homogeneous mixture varying between 2:1 and 1:2 parts by weight, said composition having a surface resistance at 30% RH of less than $1.10^{10}$ ohm/10 sq.cm. and at 60% RH less than $1.10^9$ ohm/10 sq.cm.

2. A material according to claim 1 wherein the waxy material is N, N-ethylene-bis-oleylamide.

3. Photographic film material comprising a polyester film support, at least one light-sensitive silver halide emulsion layer on one side of the polyester support, and on the other side a layer of an antistatic coating composition for a polyester film support, comprising an homogeneous mixture of (A) a chlorine-containing polymer consisting of at least 70% by weight of at least one monomer taken from vinyl chloride and vinylidene chloride, and (B) a polymeric material having electroconductive properties, the ratio of chlorine-containing polymer to electroconductive polymeric material in said homogeneous mixture varying between 2:1 and 1:2 parts by weight, said composition having a surface resistance at 30% RH of less than $1.10^{10}$ ohm/10 sq.cm. and at 60% RH less than $1.10^9$ ohm/10 sq.cm., said antistatic layer having a thickness not greater than about 1 micron.

4. A material according to claim 3 wherein said antistatic layer has a thickness in the range between about 0.4 and about 1 micron.

5. A material according to claim 3 wherein the chlorine-containing polymer is a copolymer of vinyl chloride and vinyl acetate containing 87% by weight of vinyl chloride.

6. A material according to claim 3 wherein the chlorine-containing polymer is the copolymer of vinylidene chloride, N-tert-butylacrylamine, n-butyl acrylate and itaconic acid (70:23:3:4% by weight).

7. A material according to claim 3 wherein the polymeric material having electroconductive properties is the sodium salt of the copolymer of styrene and maleic acid (50:50 mole %).

8. A material according to claim 3 wherein the polymeric material having electroconductive properties is the sodium salt of the copolymer of N-(methacryloyloxyethyl)-trimethylammonium methylsulphate, β-chloroethyl acrylate and acrylic acid (60:25:15 mole %).

* * * * *